3,313,691
SUBSTANCES BELONGING TO CHROMOMYCIN A GROUP AND THEIR PRODUCTION
Akira Miyake, Nishinomiya, Komei Mizuno, Osaka, Kôiti Nakazawa, Amagasaki, Yoshitomo Aramaki, Suita, and Kyo Kaziwara, Nishinomiya, Japan, assignors to Takeda Pharmaceutical Industries, Ltd., Osaka, Japan
No Drawing. Filed Sept. 15, 1958, Ser. No. 760,851
Claims priority, application Japan, Sept. 16, 1957, 32/23,097; Dec. 3, 1957, 32/30,015
12 Claims. (Cl. 167—65)

This invention relates to substances belonging to chromomycin A group, especially chromomycin $A_3$, and to a method for preparing them. In 1955 Nakazawa and Miyake, who are also among the present inventors, found with their collaborators that a strain of Streptomyces produces a group of antibiotics as its metabolite and named them Chromomycin (Annual Reports of Takeda Research Laboratory, vol. 14, 60–91 (1955)). The strain was isolated from the soil collected at Toyonaka, Osaka Prefecture. From its bacteriological properties the strain was found to be akin to the strains belonging to *Streptomyces griseus*, but differing from the known strain in that it produces not such antibiotics as streptomycin, grisein, candicidin, rhodomycetin, actidione, streptocin, etc., but chromomycin whose antibiotic spectrum is different from that of the above antibiotics. Therefore, even if the strain belongs to *Streptomyces griseus* it is clearly different from the known strains. So the inventors named it *Streptomyces griseus* No. 7 (referred to as "strain No. 7" hereinafter). Behavoirs on the nutrient medium and bacteriological properties of the strain are as follows.

In the table, the color names marked with Rdg. are based on Ridgway's Colour Standards and Nomenclature.

to Streptomyces are easily changeable, strains which have an external appearance different from that of strain No. 7 but produce chromomycin are isolated from natural sources or produced artifically.

Strain No. 7 grows on a medium containing usual nutrients. That is, it utilizes glucose, starch, dextrin, fructose, lactose, sucrose, etc. as carbon source, organic and inorganic nitrogens such as peptone, meat extract, soy-bean meal, cornsteep, ammonium sulfate, ammonium nitrate, yeast, amino acids, etc. as nitrogen source, and sodium chloride, phosphates, carbonates, etc. as inorganic salt source. A small quantity of a growth factor, precursor or the like may be added to the medium. Preferable pH and temperature of the medium are neutral and about 25–30° C. respectively. In general, 4 to 5 day cultivation of strain No. 7 produces chromomycin which, though almost inactive against fungi, yeast and Gram-negative bacteria, inhibits the growth of Gram-positive bacteria. The product may be separated from the culture mixture in optional purity, and though the separation is effected by the usual methods used for the separation of active substances from culture mixtures, it is carried out most simply by extracting the culture mixture with a proper solvent. Of course, other procedures utilizing the physical and chemical properties of the objective substance, such as adsorption, elution, salting out, dissolving, concentrating, chromatography, etc., may be employed. In the liquid culture the production of chromomycin begins from around the second day and reaches the maximum at the 4th or 5th day, and therefore the product is isolated at that time. When the separation is effected by extraction with a solvent, a hydrophilic or hydrophobic solvent is used according to the state of the material to be treated.

The chromomycin thus obtained is generally a greenish black and slightly yellow fluorescent powdery sub-

*Streptomyces griseus*—Strain No. 7

| Medium | Cultural Characteristics | | | Remarks |
|---|---|---|---|---|
| | Growth | Aerial Mycelium | Soluble pigment | |
| Glucose Nutrient agar. | Colourless folded. | Powdery, Tilleul-Buff (Rdg. XL 17''', O-Y, f). | None | Reverse faint brown. |
| Nutrient agar | Colourless | Chalk white | do | |
| Czapek's agar | Colourless thin. | Powdery, Tilleul-Buff (Rdg. XL 17''', O-Y, f). | do | |
| Starch agar | do | do | do | |
| Glucose asparagine agar. | Colourless | do | do | |
| Potato Plug | do | do | | |
| Carrot Plug | do | do | | Dark Ivy Green (Rdg. XLVIII 25'''' YG-Y, k) around the growth. |
| Calcium Malate agar | do | Olive Buff (Rdg. XL, 21''', O-YY, d). | Primose Yellow (Rdg. XXX, 23'', yellow, d). | Reverse Citrin Drab (Rdg. XL, 21''', O-YY, i). |
| Milk | | | | Colourless ring. No coagulation. Peptonization slowly. |
| Nitrate | | | | Nitrate reduction. |
| Starch plate | | | | Starch hydrolysis, enzymatic zone: growth zone=23 mm.: 9 mm. |
| Gelatin | Colourless | Tilleul-Buff (Rdg. XL 17''', O-Y, f). | None | Proteolytic action strong. |

Conidia: Cylindrical, 0.8–1.0μ×1.4–1.8μ; Sporulating hyphae: Tuft formation.

CARBON UTILIZATION

Arabinose — 
Na-acetate — 
Maltose + 
Starch + 
Saccharose + 
Mannit + 
Dextrin + 
Lactose + 
Cellulose — 
Glycerin ±

+ Good.  ± Growth doubtful.  — No growth.

As the bacteriological properties of the strains belonging stance and melts at 140–150° C. It is soluble in acetic esters, acetone, alcohols, and dioxan, sparingly soluble in chloroform, ether, benzene and toluene, and insoluble in cyclohexane. Though soluble in alkaline water, it is hardly soluble in acid water. The ultra-violet spectrum of the alcohol solution of this substance shows no distinct absorption but slight maxima at 230 and 282 m$\mu$. But its infrared spectrum exhibits absorptions at 2.31, 2.95, 3.47, 3.70, 5.80, 6.13, 6.36, 6.63, 6.90, 7.30, 7.57, 8.14, 8.38, 8.59, 8.97, 9.15, 9.38, 9.65, 10.64, 11.10, 11.39, 11.83, 12.40, 13.25, 13.88μ, etc.

Although chromomycin is almost inactive against fungi, yeast and Gram-negative bacteria, it strongly inhibits the growth of Gram-positive bacteria, and malignant tumor cells. For example, the antibiotic spectrum of chromomycin is as follows:

| Microorganisms: | Minimum concentration for complete inhibition of growth, mcg./ml. |
|---|---|
| Staphylococcus aureus | 0.31 |
| Bacillus subtilis | 0.15 |
| Escherichia coli | >80 |
| Proteus vulgaris | >80 |
| Aerobacter aerogenes | 0.15 |
| Pseudomonas sp. | >80 |
| Micrococcus flavus | 0.15 |
| Sarcina lutea | >80 |
| Penicillium notatum | >80 |
| Aspergillus niger | >80 |
| Candida albicans | >80 |
| Willia anomala | >80 |
| Saccharomyces sake | >80 |
| Mycoderma sp. | >80 |
| Mycobacterium avium MR | >80 |

Toxicity to mice of this substance tested by its intraperitoneal injection, is $LD_{50}=1.7$ mg./kg. and its minimum effective dose to the Yoshida sarcoma cells is 34 γ/kg.

Studies of the present inventors revealed that the chromomycin obtained as above consists of many antibiotics which are broadly divided into chromomycin A group, chromomycin B group and chromomycin C group, each of the groups consisting of several antibiotics. And this fact is evidenced by the following experiments, for example.

The known chromomycin is applied on filter paper containing a definite amount of glycerin (volume of glycerin contained in a unit area/capacity of space in a unit area=15/85) and developed with a solvent system of benzene/ethyl acetate (2:1). After the development the chromatogram is bioautographed on an agar medium inoculated with Gram-positive bacteria (for example, *Staphylococcus aureus*, *Bacillus subtilis*, etc.). In this case, the substances which produce inhibition zones at $R_f$ 0.5–0.7 and 0.00–0.05 are regarded as chromomycin A group and chromomycin B+C group, respectively. The substances which produced an inhibition zone at $R_f$ 0.00–0.05 are further developed with isoamyl acetate/n-butanol (9:1) or with isoamyl acetate/acetone (4:1) and the chromatogram is subjected to bioautography as above. And in this case the substance which produces inhibition zones at $R_f$ 0.2–0.9 is regarded as chromomycin B group and that which produces an inhibition zone at $R_f$ 0.00–0.05, in other words that which remained at the original point, is regarded as chromomycin C group.

The chromomycin A group separated from the known chromomycin by the method to be described later is also developed in filter paper containing glycerin with ether/ethyl acetate (170–175:30–25) by the ascending method and the chromatogram is bioautographed as before. And the substances which produce inhibition zones at $R_f$ 0.7–0.85, 0.5–0.6, 0.35–0.45, 0.25–0.30, and 0.15–0.25 are regarded as chromomycin $A_1$, $A_2$, $A_3$, $A_4$ and $A_5$, respectively. As there is a definite relation between the area of the inhibition zones and the amount of the sample, the content of each component is roughly calculated from the area of the inhibition zone it produced.

Of the chromomycin A group it is $A_3$ that is produced by strain No. 7 in the largest quantity, and the quantity of other components decreases in the order of $A_2$, $A_4$, $A_1$ and $A_5$. The chromomycin B group separated from the known chromomycin mixture by the method to be described later is believed to comprise chromomycin O group consisting of $O_1$ and $O_2$ produced by mild oxidation of chromomycin A group, chromomycin P group which is supposed to have been produced from chromomycin A group by heating, chromomycin F which is regarded as complex compounds of chromomycin O group with heavy metal ions such as iron ion, and others. When chromomycin B group is developed on filter paper with butyl acetate/acetone (95:5) and the chromatogram is bioautographed as in the case of chromomycin A group, chromomycin $O_1$, $O_2$, P group and F group produce inhibition zones at $R_f$ 0.87–0.93, 0.75–0.8, 0.6–0.7 and 0.25–0.4, respectively. If in this case chromomycin A and C groups coexist, they produce inhibition zones at $R_f$ 0.95–1.0 and 0.00–0.05, respectively. Chromomycin C group is supposed to be produced by the partial decomposition of chromomycin A or B group, but details are still to be seen.

The foregoing is summarized as in the following table.

Chromomycin mixture.
- Chromomycin A group
  - Chromomycin $A_1$
  - Chromomycin $A_2$
  - Chromomycin $A_3$
  - Chromomycin $A_4$
  - Chromomycin $A_5$
- Chromomycin B group
  - Chromomycin O group
  - Chromomycin P group
  - Chromomycin F group
- Chromomycin C group In this specification the above substances are called hereafter merely by the names of A group, B group, C group, $A_1$, $A_2$, $A_3$, etc., respectively. $A_2+A_3$ for example means a mixture of $A_2$ and $A_3$, and to avoid confusion the known chromomycin is called chromomycin mixture. As will be described later in detail the most active group of the above groups is A group, and in A group $A_3$ and $A_2+A_3$ are especially active.

As mild reduction of the portion containing O and F groups converts them into A group without affecting the co-existing P and C groups and the originally existing A group, the A group content in chromomycin mixture containing F or O group can be increased if the mixture is reduced by one of the methods mentioned below before it is divided into groups or components. This reduction is generally effected on a solution of the substance to be reduced. As the solvent there may be used water, lower alcohols, lower fatty acids, lower fatty acid esters, lower aliphatic ketones, etc. and they are used separately or as a mixture. Any reducing agent may be employed for the purpose so long as it keeps the reaction system acid or slightly basic.

In general, reducing gases such as hydrogen sulfide and sulfur dioxide, sulfites (including hyposulfites and bisulfites), a metal such as zinc and tin plus an acid, an activated metal such as activated aluminium plus water, etc., may be used. When the reduction is effected catalytically, the material is shaken in an atmosphere of hydrogen in the presence of Raney-Ni, Pd-black, Pt-black or the like. When the material contains F group, its color turns yellow from blackish green with the progress of the reaction so long as the coloring is not prevented by coexisting substances. Of course, F group itself (O group may be contained) separated from chromomycin mixture or F group contained in the mixture can be reduced into A group by the above-mentioned methods.

The A group thus produced has quite the same properties as the A group directly separated from the culture mixture. For example, they are identical in the migration in paper chromatography and their main active components ($A_3$) are also identical in absorption in the infrared and ultraviolet spectra. A mixture of the acetyl compounds derived from both main active components shows no depression in melting point. Also the minimum effective dose against the Yoshida sarcoma and toxicity to mice of both A groups are 22 γ/kg. and 2.1 mg./kg., respectively.

The present inventors have made studies for more effectively separating chromomycin mixture, i.e. for obtaining $A_3$ or $A_2+A_3$ from chromomycin containing substances and established the following methods.

The materials used in the method of the present invention are substances containing A group. The A group-containing substances comprise the culture mixture of chromomycin producing strains such as strain No. 7, its extract and processed substance and a substance containing A group which was produced by the reduction of F and O groups, not to speak of the chromomycin mixture mentioned above. Of course, the A group-containing substance obtained by the direct reduction of the culture mixture of chromomycin producing strains such as strain No. 7 may be used as the said material. High or low content of $A_3$ in the materials does not affect the scope of this invention.

This invention relates to a method for separating or isolating A group, especially $A_3$, from A group-containing substances, and the method is broadly divided as follows:

(A) Precipitation
(B) Distribution
(C) Adsorption chromatography
(D) Partition chromatography
(E) Counter current distribution By a proper combination or repetition of these procedures A group is separated, and further $A_3$ is isolated from the separated A group.

Following are detailed explanations of each procedure.

(A) *Precipitation*

This procedure utilizes difference in solubility to various solvents of each component and is employed for separating each group or for separating $A_2+A_3$ from A group.

In general chromomycin is readily soluble in solvents with high polarity and sparingly soluble in solvents with low polarity. But A group dissolves also in solvents with comparatively low polarity. On the contrary, dissolution of C group requires solvents with high polarity such as lower aliphatic alcohols. B group mediates between A and C groups. Consequently, each of A, B and C groups can be separated by use of a proper combination of solvents with high polarity such as lower aliphatic alcohols, lower aliphatic ketones and lower fatty acid ester with solvents with low polarity such as lower aliphatic ethers, chloroform, trichloroethane, carbon-tetrachloride, toluene, benzene, petroleum benzine and petroleum ether, or by changing the ratio or temperature of the solvents. The separation can be effected by dissolving out each group fractionally from a solid material or by fractionally precipitating each group from a solution containing the three groups.

This procedure also is utilized for separating $A_2+A_3$ from A group. For example, A group is dissolved in a solvent with comparatively high polarity such as acetic acid esters and a solvent with comparatively low polarity, or a non-polar solvent such as ether, benzene, cyclohexane and petrolic solvents is added stepwise to the solution. Each precipitate produced at each step is subjected several times to the same procedure, $A_2+A_3$ being collected as an intermediate portion. The $A_2+A_3$ thus obtained has generally a definite composition and its $A_3$ content is about 70–75%. The yield is more than 70–80%.

(B) *Distribution*

This is a procedure which utilizes difference between active components or between active components and impurities in distribution coefficient between two solvent phases and which is employed for separating each group or for separating $A_2$ and $A_3$ from their mixture. This procedure is effectively employed for treating a comparatively large quantity of chromomycin mixture. That is, in this procedure the material is extracted with a proper combination of polar and non-polar solvents or distributed between them and such procedures are repeated, whereupon each of A, B and C groups is separated. For example, chromomycin mixture is dissolved in a polar solvent such as acetic acid esters and a non-polar aromatic hydrocarbon such as benzene is added, when the majority of B and C groups is precipitated, which is separated by filtration. Teh filtrate contains A group in a large quantity, besides small amounts of B and C groups. For further purification of the A group the filtrate is shaken several times with a polyhydric alcohol such as glycerin which contains water, methanol or ethanol and then with water respectively to remove B and C groups and a non-polar solvent such as petroleum benzine or petroleum ether is added, whereupon the remaining B group is precipitated. After removal of the precipitate the filtrate is treated again with a polyhydric alcohol and water as above and, after being dried and concentrated mixed with a non-polar solvent such as cyclohexane or petroleum ether, when A group containing almost no other groups is precipated in the form of yellow powder. The polyhydric alcohol and water layers mentioned above are shaken with a mixture or water, acetone and ethyl acetate and with ethyl acetate, respectively, and each of the upper layers is washed with water, concentrated and mixed with petroleum ether, when a precipitate rich in C group is precipitated from the former and a precipitate rich in B group from the latter.

By properly utilizing the method of this paragraph pure $A_3$ is separated from the $A_2+A_3$ obtained by the precipitation method A.

(C) *Adsorption chromatography*

This procedure utilizes difference between active components or between active components and impurities in adsorbability and is effectively employed for separating each group.

For example, chromomycin mixture is adsorbed in one of adsorbents with various surface activities and the adsorbent is treated with solvents with various polarities in the order of their polarities (from low polarity to high polarity), whereupon the three groups are eluted in the order of their polarities (from low polarity to high polarity), in other words, in the order of A, B, C groups. When the polarity of a solution of chromomycin mixture in a solvent with high polarity such as ketones or acetic acid esters is gradually lowered by the addition of a solvent with low polarity such as aromatic hydrocarbons or petrolic solvents in the presence of an adsorbent, the three groups are adsorbed in the order of their polarities (from high polarity to low polarity), e.g. in the order of C, B and A groups. The above procedures are also, employed for separating each component from each group. For example, when A group is subjected to these procedures, comparatively pure $A_3$ (70–80%) containing a small amount of $A_2$ can be separated.

The adsorbents used in the adsorption chromatography are acidic alumina, silica gel and silicates for example. Magnesium silicate is especially favorable.

(D) *Partition chromatography*

This procedure utilizes difference between the three groups in their partition coefficients between two solvent phases in chromatography and is employed for separating each group and for separating $A_2$ and $A_3$ from $A_2+A_3$. In this procedure, starch, cellulose powder or the like is used as supporter. The supporter is preferably freed from impurities such as metal ions and organic acids before use. A supporter with small adsorbability such as low adsorption silica gel is also employed for the purpose. As the stationary phase there may be used an aqueous polyhydric alcohol and as the mobile phase various mixtures such as a lower fatty acid ester/a lower aliphatic ether, a lower aliphatic ketone/a lower fatty acid ester, and a lower aliphatic ketone/a lower aliphatic alcohol. For example, when chromomycin mixture is subjected to partition chromatography using these solvent systems, A group is eluted in the solvent of ether/acetic acid ester system, B group in the solvent of acetic acid ester/acetone system, and C group in alcohols.

When this procedure is applied to $A_2+A_3$, $A_2$ and $A_3$ are eluted in this order in the ether/acetic acid ester solvent system, giving fairly pure $A_3$.

(E) Counter current distribution

When chromomycin mixture is subjected to this procedure using a polyhydric alcohol containing water, methanol or ethanol and a solvent immiscible with the former, such as a mixture of ether/acetic acid ester, or ether/acetic acid ester/acetone, or acetic acid ester/acetone, A, B and C groups are separated from each other. This procedure also may be effectively employed for separation of $A_2$ and $A_3$. For example, when $A_2+A_3$ is distributed with Craig's apparatus consisting of more than 100 tubes using acetic acid ester/ether as mobile phase, $A_2$ is separated on the side anteriorly of the mobile phase and $A_3$ is separated just behind $A_2$ (about in the middle tubes).

According to the procedures mentioned above, A group is first separated from chromomycin mixture, then $A_2+A_3$ from group A and finally $A_3$ is isolated in pure state from $A_2+A_3$.

$A_2+A_3$ obtained as the final product in the precipitation method or in the distribution method has always a definite composition, the ratio of $A_2$ and $A_3$ being about 25:75. Acetylation of $A_2+A_3$ with pyridine and acetic anhydride for more than 10 hours at room temperature, followed by recrystallization from methanol or from ethanol gives a small amount of pale yellow crystals, M.P. 225° C. and a larger amount of yellow needles, M.P. 240° C. Of the two substances the latter is an acetyl derivative of $A_3$, which is more soluble in ethanol than the former.

The above-mentioned $A_2+A_3$ is a yellow amorphous substance which turns brown at 155-160° C., softens at 175-180° C. and decomposes at 190-200° C. When this substance is subjected to the paper chromatography used for separation of each component from A group, it gives two spots. This substance is insoluble in petroleum ether and cyclohexanone, sparingly soluble in water, soluble in ether, chloroform and carbon disulfide, and readily soluble in alcohols, acetone and acetic acid esters. It has strong antibiotic and antitumor activities and seems to be the main antibiotic substance which strain No. 7 produces. The absorptions in the ultraviolet and infrared spectra of this substance bear close resemblance with those of $A_3$ to be described later.

$A_2$ separated from $A_2+A_3$ by column chromatography for example is a nearly colorless powdery substance and $A_3$ separated by the same method is a yellow powdery substance, and they give only one spot in paper partition chromatography, respectively.

$A_3$ gives a stable bluish green coloration with a mixture consisting of the same volumes of 1% $FeCl_3$ solution and 1% $K_3Fe(CN)_6$ solution. And an aqueous alkaline solution of this substance turns dark red on admixture with diluted $H_2O_2$ solution but the color fades gradually.

Analytical value of $A_3$:

|   | I | II |
|---|---|---|
| C | 55.97% | 56.50% |
| H | 7.04% | 7.14% |

Qualitative analysis of $A_3$ shows that it contains no halogen, nitrogen and sulfur. Its molecular weight measured by Rast method is 467±50 and that measured by Barger method is 900-1000, and therefore the molecular formula is assumed to be $(C_{20-22}H_{28-32}O_{10-11})_n$. This substance has at least three ester combinations (formyl and acetyl), of which at least one is formyl, and its specific rotation measured at the wave of 6563 A. is $[\alpha]_C^{20}=-26°$ (c.=1.0%, ethanol).

As mentioned before, acetylation of $A_3$ with pyridine and acetic anhydride for more than 10 hours at room temperature gives an acetate, which crystallizes from ethanol in fine needles, M.P. 240° C. The analytical value of this acetate is (I) C, 56.49%, H, 6.55%; (II) C, 56.91%, H, 6.68%; (III) C, 57.33%, H, 6.65% and its molecular weight measured by Rast method is 529±60. From the above analytical value the acetate is supposed to have the molecular formula of $C_{26-28}H_{36-40}O_{12-13}$, and it seems that this substance was produced by replacement of the formyl group of $A_3$ ($C_{20-22}H_{28-32}O_{10-11}$) by an acetyl group and acetylation of its two free acidic hydroxyl groups. The specific rotation of $A_3$ acetate is $$[\alpha]_D^{24}=-28° \text{ (c.}=0.5 \text{ ethanol)}$$

Compared with $A_3$, $A_3$-acetate has far weaker antibiotic activity, but the product obtained by allowing the acetate to stand with a diluted aqueous sodium carbonate solution (pH, about 9) in ethanol at room temperature for more than several hours has the same antibiotic activity as the product obtained from $A_3$ under the same conditions and both products show the same spot on the paper chromatogram. From these facts $A_3$-acetate appears to be a crystalline derivative of $A_3$ formed without seriously changing the structure of the latter, and so it may be possible to investigate the structure of $A_3$ using its acetate as footing.

From the properties mentioned above, $A_3$ is a new antibiotic. Antibiotic activity measured by the Waksman dilution method, $LD_{50}$ in mice tested by intraperitoneal injection, and minimum effective dose against the Yoshida sarcoma of each chromomycin group are shown in the following tables:

TABLE 1.—ANTIBIOTIC EFFECT OF EACH GROUP

|   | Staphylococcus aureus, mcg./cc. | Bacillus subtilis, mcg./cc. |
|---|---|---|
| Chromomycin mixture | 0.31 | 0.15 |
| A group | 0.125 | 0.1 |
| B group | 0.5 | 0.2 |
| C group | 2 | 1 |
| $A_2+A_3$ | 0.125-0.1 | 0.05 |

TABLE 2.—TOXICITIES OF CHROMOMYCIN

[$LD_{50}$ i.p. to mice]

|   | Mg./kg. |
|---|---|
| Chromomycin mixture | 1.7 |
| A group | 2.1 |
| A group+B group | 1.5 |
| $A_2+A_3$ | 1.3 |

TABLE 3.—MINIMUM EFFECTIVE DOSE AGAINST CELLS OF YOSHIDA SARCOMA

|   | Mcg./kg. |
|---|---|
| Chromomycin mixture | 34 |
| A group | 22 |
| A group+B group | 22 |
| $A_2+A_3$ | 10-15 |

Antibiotic spectrum of $A_3$ was found to be as follows:

TABLE 4.—ANTIBIOTIC SPECTRUM OF CHROMOMYCIN $A_3$

| Microorganism | Minimum concentration for inhibition of growth, mcg./ml. | Medium |
|---|---|---|
| Micrococcus pyogenes var. aureus (Terajima) | 0.5 | (1) |
| Micrococcus pyogenes var. aureus (209 P) | 0.1 | (2) |
| Bacillus subtilis (NRRL-B588) | 0.25 | (1) |
| Bacillus subtilis (P.C.I. 219) | 0.1 | (2) |
| Salmonella typhi (Boxhill-58) | >100 | (1) |
| Shigella dysenteriae (EW. 1) | >100 | (1) |
| Vibrio cholerae (Inaba) | 100 | (1) |
| Bacillus proteus sp | >100 | (1) |
| Escherichia coli (Umezawa) | >100 | (1) |
| Pseudomonas pyocyanea sp. (Ps. aeruginosa) | >100 | (1) |
| Proteus vulgaris | 50 | (2) |
| Bacillus cereus | 0.1 | (2) |
| Micrococcus flavus | 0.125 | (2) |
| Sarcina lutea | 0.125 | (2) |

Medium:
(1) Meat Extract _____ 0.5%
    Peptone _____ 1.0%
    NaCl _____ 0.2%
    Agar _____ 2.0%
    pH _____ 7.2

(2) Meat Extract _____ 0.5%
    Peptone _____ 0.5%
    NaCl _____ 0.5%
    Agar _____ 2.0%
    pH _____ 7.0

When mice were inoculated with the Ehrlich ascites carcinoma and after 24 hours A group was administered by intraperitoneal injection at a dose of 5–40 mcg./kg./day, their life span was prolonged at least several times compared with the control.

Under similar conditions as above, A group was also effective to prolong the life span of mice inoculated with ascites carcinoma cells SN 36, SA 180 or with Yoshida sarcoma cells.

As mentioned before, A group, especially $A_3$ show strong antibiotic activity against Gram-positive bacteria and strongly inhibit the growth of malignant cells. In addition, as they have comparatively low toxicity at a minimum effective dose, they will cause remissions, alleviate pain and prolong life in cases of leukemia and like malignancies in mice, when they are administered solely or together with a suitable solubilizer such as sodium salicylate or other excipients by intravenous or by external application.

The strain No. 7 usable for producing chromomycin mixture has been deposited at Institute for Fermentation, Osaka and American Type Culture Collection, Washington, D.C., under the accession number of IFO-3746 and ATCC-13273, respectively. And the strain No. 7 is different from one of the closest known strains, *Actinomyces griseus* Waksman et Curtis (1916), in the following cultural characteristics:

| | Strain No. 7 | Actinomyces griseus, Waksman et Curtis (1916) |
|---|---|---|
| Growth on Carrot plug | Colourless thin | Sulphur yellow to dirty yellow. |
| Soluble pigment on Calcium malate agar. | Primose yellow | None. |
| Milk coagulation | No coagulation | Coagulation rapid. |
| Growth with arabinose (Sugar Utilization). | No growth | Good growth. |

Following are examples showing practical operations of the method of the present invention but they do not restrict the scope of this invention.

In the examples, chromomycin mixture (II) means a mixture rich in A group, obtained by reduction of the culture mixture of strain No. 7 or its processed product, and it is distinguished from chromomycin mixture (I) which is directly obtained from the culture mixture of strain No. 7. Chromomycin mixture (III) is a mixture which consists of $A_2$ and $A_3$ in the main but contains small quantities of other components of A group, and which is obtained from chromomycin mixture (II) by the precipitation method (detailed description of this substance will be made in Example 3(1)).

Units in the examples were all measured by the Waksman dilution method and (S) and (B) attached to units mean that *Staphylococcus aureus* and *Bacillus subtilis* were used as test microorganisms.

"Ether" in the examples generally implies diethyl ether, and some times methyl, ethyl, butyl and acetyl groups are shown by abbreviations of Me, Et, Bu, and Ac, respectively. For example, MeOAc, $Et_2O$, $Me_2CO$, and BuOH indicate methyl acetate, diethyl ether, acetone, and butanol, respectively.

EXAMPLE 1

In 100 liters of an incubation medium composed of 3.0% of starch, 0.5% of peptone and 0.5% of malt extract in a culture vessel is incubated aerobically a seed culture of strain No. 7, for 66 hours under agitation to obtain a broth having a potency of 1000–1500 u./cc. (S), or 3000–3500 u./cc. (B). The fermentation broth is filtered to obtain 10 l. of a pasty substance. The pasty substance is subjected to extraction with two 5 l.-portions of acetone, and the acetone extracts are combined with the culture filtrate, and the combined solution is again subjected to extraction with three or four 50 l.-portions of ethyl acetate to shift all the active substances into the ethyl acetate layer. The combined ethyl acetate extracts (ca. 200 l.) are washed with water four times (20 l., 30 l., 40 l. and 50 l., successively), dried over anhydrous sodium sulfate, and concentrated under reduced pressure to leave ca. 50 g. of a blackish green oily substance. The oily substance is sufficiently washed with petroleum ether to obtain ca. 30–35 g. of a greenish black and slightly yellow fluorescent powdery substance having a potency of 7500–10,000 u./mg. (S), or 15,000–20,000 u./mg. (B).

When the product (chromomycin mixture (I)) is separated into A, B and C groups by paper partition chromatography, it is observed that 60–70% of the product is F group, which is included in B group. Namely, the product contains F group as the main component, A group, B group (except F group) and C group being contained in small quantities.

EXAMPLE 2

(1) To a solution of 10 g. of chromomycin mixture (I) in 300–1000 cc. of ethyl acetate is added about a half its volume of water and 3–5 g. of anhydrous sodium hydrosulfite (hyposulfite). The solution is shaken in a closed vessel and the addition of sodium hydrosulfite and shaking are repeated several times until the blackish green colour of the ethyl acetate layer changes completely into reddish orange. The ethyl acetate layer is washed with distilled water several times to remove sulfite ion completely. After ascertaining that the reddish orange colour of the ethyl acetate layer no longer changes back into blackish green, the layer is dried over anhydrous sodium sulfate. The ethyl acetate solution is concentrated under reduced pressure, and cyclohexane or petroleum ether is added to the residue to separate yellow powder (chromomycin mixture (II)). The powder is rich in the A group obtained directly from the fermentation broth of strain No. 7. More excellent results may be obtained if the after-treatment is conducted in the atmosphere of an inert gas.

Use of sodium sulfite, sodium bisulfite or the like instead of sodium hydrosulfite may give similar results.

(2) To a solution of 10 g. of chromomycin mixture (I) in 300–1000 cc. of ethyl acetate is added about a half its volume of water, and ca. 1 g. of zinc powder. To the mixture is further added a little amount of formic acid to make the aqueous layer acid. The mixture is warmed a little while, whereupon the blackish green colour of the ethyl acetate layer rapidly changes into reddish orange. The ethyl acetate layer is quickly separated from the aqueous layer, and is washed with distilled water several times while a small amount of zinc powder is added in portions.

After ascertaining that the colour of ethyl acetate layer no longer changes into blackish green, the layer is treated as in Example 2(1) to obtain chromomycin mixture (II) having the same properties as the yellow powder obtained in Example 2(1).

In this example, zinc powder may be replaced with tin, and formic acid with acetic acid or a mineral acid such as hydrochloric acid.

(3) To a solution of chromomycin mixture (I) in 300–1000 cc. of ethyl acetate is added an aqueous solution of sodium bicarbonate saturated with carbon dioxide. Sulfur dioxide gas is passed through the mixture to change the blackish green colour of ethyl acetate layer into reddish orange. The ethyl acetate layer is quickly separated from the aqueous layer and washed with distilled water. After ascertaining that the colour of ethyl acetate layer no longer changes into blackish green, the solution is treated as in Example 2(1) to obtain the same substance as in Example 2(1).

(4) To a solution of 1.0 g. of chromomycin mixture (I) in 30 cc. of ethanol is added 0.5 g. of palladium black containing ca. 10% of reduced palladium. Hydrogen gas is passed through the mixture under shaking to make the mixture adsorb ca. 1 mole of hydrogen and to change the blackish green colour of the mixture into reddish orange or deep yellow. After filtering in a stream of nitrogen, the solution is poured into a mixture of ethyl acetate and a dilute aqueous solution of sodium bicarbonate. After shaking the mixture, to transfer the active component into the organic solvent layer and impurities into the aqueous layer, the ethyl acetate layer is quickly separated. The same catalytic reduction as above is repeated again. In this case, the amount of the catalyst may be ca. ⅓ of that of the catalyst used in the first reduction.

Treatment similar to that in Example 2(1) of the solution gives the same substance as in Example 2(1).

Instead of palladium black, ca. 50 mg. of platinum black, 1–2 g. of Raney nickel or the like may be used as the catalyst, and similar treatment to that in the reduction over palladium black gives the same substance as mentioned above.

(5) When the B group, especially O and F groups obtained by the method to be described later are used as the material in Example 2(1)–(4), a substance rich in A group is yielded. Especially, from O and F groups there is separated by employing only the procedure of the above example the same A group as that separated directly from the culture broth of strain No. 7.

EXAMPLE 3

(1) To a solution of 10 g. of chromomycin mixture (II) in 100 cc. of ethyl acetate is added 60 cc. of cyclohexane, and the resulting precipitate (0.5–1.0 g., chiefly, B group and C group) is separated by filtration. A portion of 70–90 cc. of cyclohexane is added to the filtrate to separate the second precipitate (7–7.5 g., chiefly $A_2$ and $A_3$, and a trace of $A_1$). This precipitate, which is designated as chromomycin mixture (III), is also separated by filtration. To the filtrate is further added 90–110 cc. of cyclohexane to separate the third precipitate (1–1.5 g., $A_3$, $A_4$ and $A_5$), and finally 200 cc. of petroleum ether is added to the filtrate to separate the fourth precipitate (0.1–0.3 g., $A_1$, B group and coloured inactive substances).

(2) To a solution of 10 g. of chromomycin mixture (I) in 100 cc. of ethyl acetate is added stepwise cyclohexane as in Example 3(1) to separate the following fractions.

1st precipitate (ca. 7–7.5 g.) -- B group containing chiefly F group, and a little amount of C group.

2nd precipitate (ca. 1.5–2 g.) -- $A_2+A_3$ containing $A_3$ chiefly.

3rd precipitate (ca. 0.2–0.3 g.) - $A_2+A_3+A_4+A_5$.

EXAMPLE 4

(1) To a solution of 10 g. of chromomycin mixture (III) in 100 cc. of ethyl acetate is added 100 cc. of ether to separate the first precipitate (ca. 0.5–0.7 g., chiefly B group, C group and $A_3+A_2+A_1$). To the filtrate is further added 100–300 cc. of ether to separate the second precipitate (7–7.5 g., chiefly $A_3$ and a little amount (5–10%) of $A_2$), and 200 cc. of petroleum ether is added to the filtrate to separate the third precipitate (1–1.5 g.) containing $A_3$ and a considerable amount of $A_4$ and $A_5$.

The second precipitate is further purified in a similar treatment to the above to obtain nearly pure $A_3$ (containing $A_2$ as the impurity) the purity of which is 95–100%.

(2) To a solution of 10 g. of chromomycin mixture (II) in 100 cc. of ethyl acetate is added 100–150 cc. of ether to separate the first precipitate (1–1.5 g., chiefly B group and C group and a little amount of $A_1$, $A_3$, etc.). And 100–250 cc. of ether is added to the filtrate to separate the second precipitate (6.5–7 g., chiefly $A_2+A_3$) which corresponds to chromomycin mixture (III). The third precipitate (1–1.5 g.) separated from the filtrate by addition of 200 cc. of petroleum ether contains $a_3$, $A_4$, $A_5$ and B group.

(3) To a solution of 10 g. of chromomycin mixture (I) in 100 cc. of ethyl acetate is added stepwise ether and petroleum ether in a similar manner to that in Example 4(2) to separate the following three kinds of precipitate:

1st precipitate (7 g.) ------ B group chiefly containing F group and a little amount of C group.

2nd precipitate (1.5 g.) ---- $A_2+A_3$ chiefly containing $A_3$.

3rd precipitate (0.5 g.) ---- A group.

EXAMPLE 5

(1) To a solution of 10 g. of chromomycin mixture (I) in 500 cc. of ethyl acetate is added 1500 cc. of benzene to separate ca. 7 g. of blackish green precipitates. To a solution of the precipitates in 300 cc. of ethyl acetate is added 900 cc. of benzene to separate 4.5–5.5 g. of a precipitate which chiefly consists of F group but contains C group.

The combined filtrate is shaken first with three 200 cc.-portions of 85% aqueous glycerin and then with three to five 400 cc.-portions of distilled water to transfer C and F groups into the glycerin layer and B group (chiefly F group) into the aqueous layer. To the upper layer is added 800 cc. of petroleum ether to give 0.5–0.7 g. of precipitate consisting of B group (chiefly O group). The filtrate is shaken several times with 85% aqueous glycerin and distilled water respectively to leave only A group in the upper layer. After drying over anhydrous sodium sulfate, the upper layer is concentrated at a low temperature under reduced pressure. To the residue is added 3–5 times its volume of petroleum ether to precipitate 2–2.2 g. of A group.

(2) Treatment similar to that in Example 5(1) is conducted on 10 g. of chromomycin mixture (II) to obtain ca. 7–7.5 g. of the A group nearly free from B and C groups. The purity of the A group obtained through the above path is found to be higher than that of the products in Examples 3 and 4 judging from the results of their paper partition chromatography. From the $A_2+A_3$ obtained by Example 3 or 4, $A_3$ can be isolated through the above process and the $A_3$ thus obtained is nearly pure although the yield is not satisfactory (total yield from chromomycin mixture (II) is ca. 40%).

EXAMPLE 6

(1) To a solution of 1 g. of chromomycin mixture (I) in 10–20 cc. of ethyl acetate is added 10–20 cc. of chloroform, and the solution is poured into a column packed with 100 g. of synthetic magnesium silicate. A 500–1500 cc.-portion each of the undermentioned solvents is added to the column to elute the active components separately. In the following table, the left colunm shows elution solvents and the right column shows the components eluted and their yields.

| | | |
|---|---|---|
| $CHCl_3$:EtOAc (1:1) | } $A_1+A_2$ | |
| $CHCl_3$:MeOAc (1:1) | | |
| EtOAc | $A_2+A_3$ | A group |
| EtOAc:MeOAc (1:2) | } $A_3+A_4+A_5$ | (0.2–0.25 g.). |
| MeOAc:$Me_2CO$ (1:1) | | |
| $Me_2CO$ | } O and P groups | B group |
| EtOH:$Me_2CO$ (1:1) | | (0.5–0.6 g. of |
| EtOH | } F group | which 0.4–0.5 g. |
| MeOH:EtOH (1:1) | | is F group). |
| MeOH | | |
| 80% MeOH | } C group (ca. 0.1 g.). | |
| Ammoniacal 80% MeOH | Inactive coloured substances. | |

(2) Treatment similar to that in Example 6(1) is effected on 1 g. of chromomycin mixture (II), then each group or mixtures of components may be collected from each eluate obtained by respective solvent systems. The yields are:

| | G. |
|---|---|
| A group | 0.6–0.7 |
| B group | 0.1–0.2 |
| C group | 0.02–0.05 |

EXAMPLE 7

(1) A solution of 0.1 g. of chromomycin mixture (I) in a mixture composed of ethyl acetate and acetone (2:1) is poured into a column packed with silica gel (200 mesh). Then each component (in the right column) is eluted separately using 50–100 cc. each of respective solvents (in the left column).

| | |
|---|---|
| EtOAc:$Me_2CO$ (1:1) | } |
| $Me_2CO$ | } A group (20–25 mg.). |
| $Me_2CO$:EtOH (2:1) | } |
| $Me_2CO$:EtOH (1:2) | A group+B group (5–10 mg.). |
| EtOH | B group (40 mg.). |
| EtOH:MeOH (1:1) | (F group (30 mg.)). |
| MeOH | |
| 80% MeOH | } C group+F group (15 mg.). |
| Ammoniacal 80% MeOH | Coloured inactive substances (trace). |

(2) Treatment similar to that in Example 7(1) on chromomycin mixture (II) gives 60–65% of A group, 15–20% of B group and 10% of C group to the material.

EXAMPLE 8

(1) Starch is washed with water, aqueous methanol containing 8-hydroxyquinoline and pure methanol, successively, and then dried under reduced pressure to produce "purified starch."

After kneading 34 g. of "purified starch" with a mixture composed of 5 g. of 85% aqueous glycerin and 15–20 cc. of methanol uniformly, the methanol and water contained in the mixture are evaporated with dried air to make ca. 38.3 g. of starch impregnated with glycerin (the starch is impregnated with glycerin in a ratio of about 100/13). On the top of a column packed with 35 g. of the starch impregnated with glycerin is packed a mixture made by uniformly kneading a solution of 5 mg. of chromomycin mixture (II) in a little amount of ethyl acetate and 0.5 g. of the "purified starch" and then evaporating the ethyl acetate completely. And 3 g. of the "purified starch" impregnated with glycerin is further placed on the column. The column thus prepared is developed with various mixtures of ethyl acetate and ether, successively (5:95, 10:90, 15:85) to give the following results.

(i) Substances eluted with EtOAc:$Et_2O$ (5:95) are chiefly inactive yellow substances and colourless $A_1$.

(ii) Substances eluted with EtOAc:$Et_2O$ (10:90), which has higher polarity than the above solvent system, are chiefly pale yellow $A_2$ and relatively deep bright yellow $A_3$.

(iii) Substances eluted with a far higher solvent system, (EtOAc:$Et_2O$ (15:85)) are pale yellow $A_4$ and $A_5$.

The yield of total A group is 80–90% in activity, 70% in weight to the material. The yield of each component to the total product is $A_1$: 3–5%, $A_2$: 10–15%, $A_3$: 65–70%, $A_4+A_5$: 10%, respectively.

After eluting A group from the column, B group is eluted with EtOAc:$Me_2CO$ (1:1), then C group with $Me_2CO$:EtOH (1:1; 1:2). From chromomycin mixture (II), B and C groups are obtained in the following yields, respectively.

| | Percent by weight |
|---|---|
| B group: 5–7% by activity | 15 |
| C group: 0.5–1.0% by activity | 5–10 |

From chromomycin mixture (I), each group may be separated as under:

| | Percent by weight |
|---|---|
| A group | 20 |
| B group containing ca. 80% of F group | 70 |
| C group | 5 |

(2) According to a similar method to that described in Example 8(1), A group rich in $A_2+A_3$ is subjected to a column partition chromatography to obtain 2–3% of $A_1$, 15% of $A_2$, 70% of $A_3$ and 5% of $A_4+A_5$, respectively. Both B group and C group are hardly separated from the material, but the isolation of $A_2$ from $A_3$ is complete.

EXAMPLE 9

Cellulose powder is purified in the same manner as in the case of "purified starch" in Example 8(1). Partition chromatography as in Example 8 is conducted using a column packed with the abovementioned "purified cellulose powder" impregnated with glycerin in a ratio of 100/18–20 to separate each group or component as in Example 8.

EXAMPLE 10

Into each tube of Craig's countercurrent distribution apparatus having 200 tubes of 20 cc. capacity are placed 10 cc. of 60% aqueous glycerin as stationary phase and 10 cc. of ether/ethyl acetate (95:5) as mobile phase. Then a solution of 20 mg. of chromomycin mixture (III) in 10 cc. of ether/ethyl acetate (95:5) is supplied to the first tube. The distribution is conducted repeatedly while 10 cc. of the above mobile phase is supplied to the first tube after each distribution and each fraction flowing out from the last tube is tested by paper partition chromatography. Then the mobile phases containing the same component are combined. After washing with water and drying, each fraction is evaporated under reduced pressure. Each residue is washed with petroleum ether to obtain $A_1$, $A_2$, $A_3$, $A_4$ and $A_5$, respectively. Among them $A_3$ is found in the largest quantity, and the yield of $A_3$ is 50–60% by weight of the material used. The yield of $A_2$ is 10% and the yield of each of $A_4$, $A_5$ and $A_1$ is extremely small.

According to the result of paper partition chromatography of $A_3$ thus obtained, the purity of the product is extremely high, therefore the method of this example is the most effective for isolating $A_3$ from other components. The larger the capacity of the apparatus is, the larger quantity of the material may be treated.

Instead of 60% aqueous glycerin, water containing 5–10% of acetone or water saturated with n-butanol may be used, results of which are almost the same as above.

What is claimed is:

1. A method for obtaining, as an independent entity, a metabolic product of *Streptomyces griseus* No. 7

(ATCC No. 13273), which product, upon paper chromatography on a filter paper containing glycerin followed by development with ether/ethyl acetate (170–175:30–25) further followed by bioautography against Gram-positive bacteria, yields an inhibition zone at $R_f$ 0.35–0.45, said entity being in the form of a yellow powdery substance composed of about 56.5 percent of carbon and 7.0 percent of hydrogen and oxygen and containing ester groups which are formyl and acetyl, having a melting point of 185° C. (decomposition), the specific rotation at 6563 A. of $[\alpha]_C^{20} = -26° \pm 5°$ (c.=1%, ethanol), and having slight maxima in the UV spectrum at 230 and 282 m$\mu$ and showing absorptions in the IR spectrum at 2.31, 2.95, 3.47, 3.70, 5.80, 6.13, 6.36, 6.63, 6.90, 7.30, 7.57, 8.14, 8.38, 8.59, 8.97, 9.15, 9.38, 9.65, 10.64, 11.10, 11.39, 11.83, 12.40, 13.25 and 13.88$\mu$, which comprises culturing Streptomyces griseus No. 7 (ATCC No. 13273) in a nutrient medium having an available nitrogen source at a temperature of about 25°–30° C., extracting the culture of the said microorganism, after removal of mycelium, by a solvent system composed chiefly of ethyl acetate, subjecting the extract thus obtained to the action of a reducing agent to obtain material rich in the aforesaid product relative to the initial extract, and further subjecting the said product to a treatment with a solvent system composed chiefly of ethyl acetate.

2. A method for producing, as an independent entity, a mixture which is a metabolite of Streptomyces griseus No. 7 (ATCC No. 13273) which is constituted by a plurality of metabolic products of the said microorganism, which products, upon paper chromatography on a filter paper containing glycerin followed by the development with ether/ethyl acetate (170–175:30–25) further followed by bioautography against Gram-positive bacteria, yield inhibition zones at $R_f$ 0.7–0.85, 0.5–0.6, 0.35–0.45, 0.25–0.30 and 0.15–0.25, respectively, from a crude mixture containing the same and consisting of the product, after removal of mycelium, of the culture of Streptomyces griseus No. 7 (ATCC No. 13273), said method comprising culturing Streptomyces griseus No. 7 (ATCC No. 13273) in a nutrient medium having an available nitrogen source at a temperature of about 25°–30° C., extracting the so-obtained crude mixture with a solvent composed chiefly of ethyl acetate, whereby there is obtained a greenish black and slightly yellow fluorescent powdery substance which melts at 140°–150° C., and which shows infrared spectrum having absorptions at 2.31, 2.95, 3.47, 3.70, 5.80, 6.13, 6.36, 6.63, 6.90, 7.30, 7.57, 8.14, 8.38, 8.59, 8.97, 9.15, 9.38, 9.65, 10.64, 11.10, 11.39, 11.83, 12.40, 13.25 and 13.88$\mu$.

3. A method for producing a metabolite of Streptomyces griseus No. 7 (ATCC No. 13273) which comprises culturing said Streptomyces griseus No. 7 (ATCC No. 13273) in a nutrient medium having an available nitrogen source at a temperature of about 25°–30° C., removing mycelium from the resultant crude mixture, and solvent extracting the said mycelium, whereby a greenish black and slightly yellow fluorescent powder substance which melts at 140° C. to 150° C. and which constitutes said metabolite is obtained.

4. A method according to claim 3, wherein the said crude mixture is directly subjected to the action of a reducing agent, whereby its content of product yielding an inhibition zone at $R_f$ 0.35–0.45, as defined in claim 1, is enhanced relative to the initial content of such product.

5. A process for producing a mixture of metabolic products rich in the product yielding an inhibition zone at $R_f$ 0.35–0.45, as defined in claim 1, which comprises applying a reducing agent to a mixture of metabolic products produced by culturing Streptomyces griseus No. 7 (ATCC No. 13273) in a nutrient medium having an available nitrogen source at a temperature of about 25°–30° C.

6. A process according to claim 5, wherein the reducing agent is hydrogen sulfide.

7. A process according to claim 5, wherein the reducing agent is sulfur dioxide.

8. A process according to claim 5, wherein the reducing agent is alkali metal sulfite.

9. A process according to claim 5, wherein the reducing agent is a metal and an acid.

10. Metabolite obtained by culturing of Streptomyces griseus No. 7, and recovering a greenish black and slightly yellow fluorescent powder substance, melts at 140–150° C., is soluble in acetone, shows infrared spectrum having absorptions at 2.31, 2.95, 3.47, 3.70, 5.80, 6.13, 6.36, 6.63, 6.90, 7.30, 7.57, 8.14, 8.38, 8.59, 8.97, 9.15, 9.38, 9.65, 10.64, 11.10, 11.39, 11.83, 12.40, 13.25 and 13.88$\mu$, and which, upon paper chromatography followed by bioautography against Gram-positive bacteria, yields inhibition zones at $R_f$ 0.7 to 0.85, 0.5 to 0.6, 0.35 to 0.45, 0.25 to 0.30 and 0.15 to 0.25, respectively.

11. Metabolite obtained by culturing Streptomyces griseus No. 7 (ATCC No. 13273) in a nutrient medium having available nitrogen source at a pH of about neutral and a temperature of about 25°–30° C. and recovering from the resulting product metabolic products designated Chromomycin $A_2$ and Chromomycin $A_3$, said metabolic products, upon paper chromatography followed by bioautography against Gram-positive bacteria, yielding inhibition zones at $R_f$ 0.5 to 0.6 and 0.35 to 0.45, respectively.

12. Metabolite of Streptomyces griseus No. 7 obtained by culturing Streptomyces griseus No. 7 (ATCC No. 13273) in a nutrient medium having an available nitrogen source at a temperature of about 25°–30° C. and recovering from the resulting product Chromomycin $A_3$ which (a), upon paper chromatography on filter paper containing glycerin followed by development with ether/ethyl acetate (170–175:30–25) followed by bioautography against Gram-positive bacteria, yields an inhibition zone at $R_f$ 0.35 to 0.45, (b) is a yellow powdery substance composed of carbon, hydrogen and oxygen, the amount of carbon being about 56.5 percent and the amount of hydrogen being about 7.04 to about 7.14 percent, (c) contains three ester groups, one to two of which are formyl and the remaining, acetyl, (d) has melting point of 185° C. (decomposition) and (e) has a specific rotation at 6563 A. of $[\alpha]_C^{20} = -26°$ (c.=1.0%, ethanol).

References Cited by the Examiner

UNITED STATES PATENTS 2,799,620   7/1957   Waksman et al. ——————  167—65

OTHER REFERENCES

Annual Reports of Takeda Research Laboratory, vol. 14, pp. 60–91, 1955 cited by applicants abstracted in Chemical Abstracts, vol. 50, 1956, page 6667.

Kuehl et al., J.A.C.S., vol. 73, 1951, pp. 1770–1773.

Nishimura et al., "Journal of Antibiotics" (Japan), Ser. A., vol. X, No. 5, September 1957.

J. S. LEVITT, Primary Examiner.

MORRIS O. WOLK, F. CACCIAPAGLIA, JR.,
Examiners.